US010822742B2

(12) United States Patent
Mupende et al.

(10) Patent No.: US 10,822,742 B2
(45) Date of Patent: Nov. 3, 2020

(54) APPARATUS FOR RECOGNIZING THE REPLACEMENT STATE OF A HIGH-STRENGTH FIBER ROPE FOR LIFTING GEAR

(71) Applicant: Liebherr-Components Biberach GmbH, Biberach an der Riss (DE)

(72) Inventors: Ilaka Mupende, Neu-Ulm (DE); Ulrich Hamme, Ehingen (DE); Hans-Dieter Willim, Ulm (DE)

(73) Assignee: Liebherr-Components Biberach GmbH, Biberach an der Riss (DE)

( * ) Notice: Subject to any disclaimer, the term of this patent is extended or adjusted under 35 U.S.C. 154(b) by 387 days.

(21) Appl. No.: 15/957,459

(22) Filed: Apr. 19, 2018

(65) Prior Publication Data

US 2018/0238815 A1 Aug. 23, 2018

Related U.S. Application Data

(63) Continuation of application No. PCT/EP2016/001716, filed on Oct. 17, 2016.

(30) Foreign Application Priority Data

Oct. 21, 2015 (DE) ........................ 10 2015 013 604

(51) Int. Cl.
*G01N 21/27* (2006.01)
*G01N 21/47* (2006.01)
(Continued)

(52) U.S. Cl.
CPC ............ *D07B 1/145* (2013.01); *B66B 7/1238* (2013.01); *B66C 15/00* (2013.01); *B66D 1/54* (2013.01);
(Continued)

(58) Field of Classification Search
CPC ............ B65H 2220/03; B65H 2220/01; B65H 2511/524; B65H 2515/112;
(Continued)

(56) References Cited

U.S. PATENT DOCUMENTS 5,890,564 A * 4/1999 Olsen ...................... B66B 7/123 187/250
6,123,176 A * 9/2000 O'Donnell ............ B66B 7/1215 187/393
(Continued)

FOREIGN PATENT DOCUMENTS

DE 2222312 11/1973
DE 2455273 11/1974
(Continued)

*Primary Examiner* — Andre J Allen
(74) *Attorney, Agent, or Firm* — Levine Bagade Han LLP

(57) ABSTRACT

The present invention relates to an apparatus for recognizing the replacement state of a high-strength fiber rope for lifting gear such as cranes as well as to a lifting gear such as a crane in which such a high-strength fiber rope is installed. It is the underlying object of the present invention to provide an improved apparatus for determining the replacement state of a high-strength fiber rope and to provide improved lifting gear having such a fiber rope that avoid the disadvantages of the prior art and further develop the latter in an advantageous manner. To be able to more easily determine the respective degree of damage of the jacket and thus the closeness to the imminent replacement state of the rope, the apparatus is provided with a reference damage memory in which reference representations of the rope with different degrees of damage to the jacket of the rope are contained to allow for an optical comparison of an actual image of the rope with the stored reference representations and thus, determination of the replacement state.

16 Claims, 8 Drawing Sheets

(51) Int. Cl.

| | |
|---|---|
| ***D07B 1/14*** | (2006.01) |
| ***B66C 15/00*** | (2006.01) |
| ***B66D 1/54*** | (2006.01) |
| ***B66B 7/12*** | (2006.01) |
| ***D07B 1/04*** | (2006.01) |
| ***G01N 21/952*** | (2006.01) |
| *D07B 1/02* | (2006.01) |
| *B66C 23/16* | (2006.01) |

(52) U.S. Cl.
CPC ............... *D07B 1/04* (2013.01); *D07B 1/148* (2013.01); *G01N 21/952* (2013.01); *B66C 23/16* (2013.01); *D07B 1/025* (2013.01); *D07B 2201/209* (2013.01); *D07B 2201/2088* (2013.01); *D07B 2201/2092* (2013.01); *D07B 2501/2015* (2013.01)

(58) Field of Classification Search
CPC .......... B65H 2511/13; B65H 2511/114; B65H 2511/152; B65H 2511/416; B65H 2511/51; B65H 2511/512; B65H 2511/514; B65H 2511/516; B65H 2513/114; B65H 2515/10; B65H 2515/30; B65H 2515/81; B65H 2220/02; B65H 2553/412; B65H 43/00; B65H 7/125; B65H 16/026; B65H 18/08; B65H 18/26; B65H 18/28; B65H 2301/41446; B65H 2301/418526; B65H 2301/422; B65H 2301/5111; B65H 2511/40; B65H 2511/52; B65H 2515/12; B65H 2553/30; B65H 2553/52; B65H 2553/61; B65H 2553/822; B65H 2557/24; B65H 2557/242; B65H 2557/31; B65H 2557/32; B65H 2557/62; B65H 2557/63; B65H 26/02; B65H 26/06; B65H 2701/192; B65H 2701/194; B65H 2701/31; B65H 2801/27; B65H 2801/81; B65H 57/04; B65H 63/062; B65H 75/182; B65H 7/02; G01N 33/346; G01N 2203/0282; G01N 3/08; G01N 33/36; G01N 33/365; G01N 2203/0278; G01N 2291/0237; G01N 2203/028; G01N 2203/0682; G01N 33/34; G01N 33/362; G01N 33/367; G01N 33/4833; G01N 15/0826; G01N 19/04; G01N 2021/8444; G01N 21/57; G01N 21/8803; G01N 2203/001; G01N 2203/0048; G01N 2203/0226; G01N 2203/0232; G01N 2203/027; G01N 2203/0641; G01N 2203/0647; G01N 2291/2632; G01N 29/041; G01N 29/045; G01N 33/442; G01N 3/04; G01N 3/12; G01N 3/20; G01N 3/307; G01N 3/313; G01N 3/317; G01N 15/08; G01N 19/02; G01N 1/286; G01N 2021/8663; G01N 2021/8917; G01N 2033/0086; G01N 21/1702; G01N 21/27; G01N 21/3559; G01N 21/64; G01N 21/80; G01N 21/84; G01N 21/8901; G01N 21/8914; G01N 21/8915; G01N 21/8983; G01N 21/91; G01N 2201/062; G01N 2203/0003; G01N 2203/0019; G01N 2203/0023; G01N 2203/0064; G01N 2203/0089; G01N 2203/0096; G01N 2203/021; G01N 2203/0216; G01N 2203/0222; G01N 2203/024; G01N 2203/0248; G01N 2203/0254; G01N 2203/0298; G01N 2203/0494; G01N 2223/01; G01N 2223/04; G01N 2223/076; G01N 2291/012; G01N 2291/014; G01N 2291/015; G01N 2291/0231; G01N 2291/0232; G01N 2291/02827; G01N 2291/02854; G01N 2291/0289; G01N 2291/0422; G01N 2291/102; G01N 2291/106; G01N 22/00; G01N 29/04; G01N 29/07; G01N 29/11; G01N 29/12; G01N 29/14; G01N 29/223; G01N 29/2418; G01N 29/27; G01N 29/348; G01N 29/44; G01N 29/4427; G01N 29/4454; G01N 29/48; G01N 33/38; G01N 33/445; G01N 33/483; G01N 37/00; G01N 3/02; G01N 3/26; G01N 3/28; G01N 3/46; G01N 3/56; G01N 3/58; G01N 5/025; G01N 9/36; B29C 66/71; B29C 66/1122; B29C 48/92; B29C 65/085; B29C 65/086; B29C 65/18; B29C 65/72; B29C 65/7435; B29C 65/7443; B29C 65/7894; B29C 65/8215; B29C 65/8223; B29C 66/1142; B29C 66/1162; B29C 66/1224; B29C 66/1226; B29C 66/1312; B29C 66/21; B29C 66/43; B29C 66/431; B29C 66/4312; B29C 66/43121; B29C 66/72321; B29C 66/72343; B29C 66/7294; B29C 66/73921; B29C 66/81433; B29C 66/8181; B29C 66/8242; B29C 66/8362; B29C 66/91221; B29C 66/91231; B29C 66/91411; B29C 66/91421; B29C 66/91431; B29C 66/91641; G01L 1/205; G01L 5/0085; G01L 5/04; G01L 5/045; G01L 1/247; G01L 5/0052; G01L 5/042; G01L 5/228
USPC ............................................................ 73/159
See application file for complete search history.

(56) References Cited

U.S. PATENT DOCUMENTS

| | | | | |
|---|---|---|---|---|
| 6,321,520 | B1 | 11/2001 | De Angelis | |
| 10,214,396 | B2 * | 2/2019 | Mupende | B66C 13/16 |
| 2012/0053852 | A1 * | 3/2012 | Padilla | G01N 29/4445 702/34 |
| 2019/0062127 | A1 * | 2/2019 | Hesselbein | B66C 23/88 |
| 2019/0218062 | A1 * | 7/2019 | Padilla | G01N 29/226 |

FOREIGN PATENT DOCUMENTS

| | | |
|---|---|---|
| DE | 202009014031 | 12/2009 |
| EP | 0731209 | 9/1996 |
| EP | 1010803 | 6/2000 |
| EP | 1930496 | 6/2008 |
| WO | WO 2012/010431 | 1/2012 |
| WO | WO 2017/067651 | 4/2017 |

* cited by examiner

APPARATUS FOR RECOGNIZING THE REPLACEMENT STATE OF A HIGH-STRENGTH FIBER ROPE FOR LIFTING GEAR

CROSS-REFERENCE TO RELATED APPLICATIONS

The present application is a continuation of International Application No. PCT/EP2016/001716, filed Oct. 17, 2016, which claims priority to German Patent Application No. 10 2015 013 604.6, filed Oct. 21, 2015, both of which are incorporated by reference herein in their entireties.

BACKGROUND

1) Technical Field

The present invention relates to an apparatus for recognizing the replacement state of a high-strength fiber rope for lifting gear such as cranes as well as to a lifting gear such as a crane in which such a high-strength fiber rope is installed.

2) Description of the Related Art

Attempts have been made in lifting technology for some time, in particular with cranes, to replace the customary heavy steel ropes with high-strength fiber ropes which consist of high-strength synthetic fibers such as aramid fibers (HMPA), aramid/carbon fiber mixtures, high-modulus polyethylene fibers (HMPE) or poly(p-phenylene-2,6-benzobisoxazole) fibers (PBO) or which at least comprise such fibers. The payload or the permitted lifting load can be increased due to the weight savings with respect to steel ropes of up to 80% with almost the same break strength since the rope's own weight, that is to be taken into account for the payload, is considerably smaller. Particularly with cranes having large lifting heights or in booms or mast adjustment gear using pulley blocks of a high reeve count, considerable rope lengths and thus also a corresponding rope weight arise so that the weight reduction possible through high-strength fiber ropes is very advantageous. In addition to the weight advantage of the fiber rope itself, there is the additional fact that the use of fiber ropes also enables a weight saving in further components. For example, the load hook can be made lighter since less load hook weight is needed for the rope tensioning of a fiber rope. On the other hand, the good flexibility of synthetic fiber ropes permits smaller bending radii and thus smaller sheaves or pulleys at the crane, which produces a further weight reduction, in particular in the field of crane booms, so that a substantial load torque increase can be achieved with large crane outreaches.

In addition to the named weight advantages, rope drives with synthetic fiber ropes are characterized by a considerably larger service life, easier handling, and good flexibility as well as the no longer required rope lubrication. A greater unit availability can hereby be achieved overall.

One difficulty with such high-strength fiber ropes, however, comprises precisely and reliably predicting or determining their replacement state. High-strength fiber ropes are, like steel ropes, wear parts that have to be replaced when their condition has deteriorated so much that the required safety is no longer present in a further operation. This condition is generally called the replacement state.

With conventional steel ropes, the replacement state can be determined in a manner that is relatively simple per se by visually inspecting the rope condition, with the procedure in the examination and the extent of the examination being specified in the standard ISO 4309. The focus in this process is substantially the number of wire breaks over a specific measurement length of the rope, a reduction of the rope diameter, and strand breaks. This measurement method is, however, not possible for recognizing the replacement state of high-strength fiber ropes since the synthetic fibers used do not behave like steel strands. There is in particular often an abrupt failure or an occurrence of the replacement state with high-strength fiber ropes without gradually recognizable prior damage since, unlike with steel ropes, it is often not individual fibers that gradually tear and split, but rather frequently a plurality of fiber strands.

A high-strength fiber rope of synthetic fibers is known from the document DE 20 2009 014 031 U1 in which a rope core is provided with a jacket that is dyed a different color than the rope core and in turn itself has different jacket layers of different colors. Due this different dye coloration, it is intended to be more easily recognizable when due to abrasion of an outer layer, a differently colored layer, disposed therebeneath, or even the rope core appears. In practice, this color indicator function, that is sensible per se, suffers from the fact that the jacket tends to fail very abruptly overall due to the properties of high-strength synthetic fibers so that it is in turn difficult to be able to determine or predict the replacement state of the rope in good time.

It is therefore the underlying object of the present invention to provide an improved apparatus for determining the replacement state of a high-strength fiber rope and to provide improved lifting gear having such a fiber rope that avoid the disadvantages of the prior art and further develop the latter in an advantageous manner. A simple, but nevertheless reliable and precise determination of the replacement state and thus a time of use that is as long as possible should in particular be made possible without impairing the safety of the fiber rope in so doing.

SUMMARY

Said object is achieved by an apparatus for determining the replacement state of such a fiber rope in accordance with claim 1 and by lifting gear having such an apparatus in accordance with claim 15. Preferred embodiments of the invention are the subject of the dependent claims.

To be able to more easily determine the respective degree of damage of the jacket and thus the closeness to the imminent replacement state of the rope, in accordance with an aspect of the present invention an apparatus for recognizing the replacement state of such a high-strength fiber rope is provided with a reference damage store in which reference representations of the rope are contained in different degrees of damage to the jacket of the rope with reference to which the respective degree of damage to and/or the degree of wear of the jacket can be determined by an optical comparison of an actual image of the rope with the stored reference representations with reference to which comparison the replacement state can then be determined. The categorization of respective ACTUAL damage in a specific damage class or the association of the ACTUAL damage to a degree of damage can be considerably facilitated using such reference representations that show the different damage conditions or damage degrees of the rope; that is, it can be much more easily determined whether the damage is small, medium or large, for example in the sense of 20% damage, 50% damage, or 75% damage.

If a plurality of damage phenomena are present in a specific rope test section, they can individually be associated with a specific degree of damage, with a summing of the individual damage phenomena to form a total degree of damage being able to take place, for example such that two 25% damage phenomena and one 40% damage phenomenon produce a total degree of damage of 90%. The replacement state can be determined on reaching a predefined total degree of damage, for example 100%.

Said determination of the replacement state using stored reference representations of the rope at different degrees of damage and an optical comparison of the actual image of the rope with said reference representations can in a very simple embodiment of the invention be manual by a visual examination carried out by an experienced person such as the crane operator who can categorize, record in writing, and sum the damage that has occurred in order then, where necessary, to determine the replacement state or to consult an expert.

In an advantageous further development of the invention, said test steps can, however, also be carried out in an automated manner using corresponding apparatus components. An actual image of the rope can, for example, be detected by means of an optical detection apparatus, for example a camera, said image then being optically compared with the reference representations stored in a reference image store by means of an automatic or semiautomatic image evaluation device, optionally with an additional monitoring by an expert, to detect and categorize damage seen in a reference image. An evaluation device can then sum the individual damage phenomena in said manner and can output a replacement state signal as required. Said apparatus for recognizing the replacement state can be integrated in lifting gear, in particular in a crane and its crane control.

The jacket of the rope core can, for example, be configured such that damage to the jacket does not occur everywhere simultaneously, but partially and gradually with reference to which gradually different damage stages and wear conditions can be determined. The jacket can, for example, have a fiber structure composed of different types of synthetic fibers that have different wear resistance and thus do not all show damage simultaneously even on uniform exposure to wear-promoting influences, but rather wear gradually. The jacket, for example, has at least one jacket layer in which plastic fibers of different abrasion resistance and/or breaking stress and/or bending fatigue strength are woven together. The different abrasion resistance and/or breaking stress and/or bending fatigue strength of the plastic fibers used in a jacket layer ensures/ensure that damage to the jacket layer only occurs partially and gradually so that different wear conditions of the rope and the remaining interval up to the replacement state associated therewith can be gradually determined and quantified using the gradually increasing damage sites.

The plastic fibers woven together in a jacket layer can comprise different materials. For example, HMPE fibers and polyester fibers can be woven together in a jacket layer. Alternatively or additionally, further ones of the initially named fibers such as PBO fibers and/or mixed aramid fibers and carbon fibers can be woven together or can also be woven into the aforesaid jacket layer.

Alternatively or additionally to plastic fibers of different abrasion strength and/or breaking stress and/or different materials in a jacket layer, the jacket of the fiber rope can also have a plurality of jacket layers, with the fibers varying from layer to layer with respect to abrasion strength and/or breaking stress and/or bending fatigue strength. A plurality of jacket layers can in particular be provided that differ from one another with respect to their fiber structures and the abrasion strengths and/or breaking stresses and/or bending fatigue strengths of the synthetic fibers used in the jacket layers.

For example, plastic fibers can be provided in a first jacket layer that differ with respect to their abrasion strengths, bending fatigue strengths and/or breaking stresses from all the plastic fibers in a second jacket layer. Plastic fibers of a specific abrasion strength and/or breaking stress can advantageously also be provided in each jacket layer that are not provided in any other jacket layer so that every jacket layer demonstrates a characteristic strength and/or stress with respect to abrasion damage and breakage damage that result in a different partial damage pattern in each jacket layer. This makes it easy to distinguish increasingly deeper damage phenomena in a simple manner.

The synthetic fibers used in the different jacket surfaces can also comprise different materials, for example such that plastic fibers of a material are provided in a first jacket layer that are not present in the second jacket layer. Alternatively or additionally, plastic fibers of a material can conversely also be provided in the second jacket layer that are not present in the first jacket layer.

Alternatively or additionally to fibers differing from layer to layer, the jacket layers of the jacket can also have different layer thicknesses and/or differently thick plastic fibers and/or plastic strands can be provided from layer to layer. Different damage patterns from layer to layer can be achieved by the use of different thick plastic fibers. It can also be ensured by the use of layer thicknesses of different thicknesses that can, for example, increase from the outside to the inside that ever deeper damage phenomena occur with more and more difficulty and initially only lighter damage phenomena that are still relatively far away from the replacement state first occur at the outer layer and are thus easy to recognize.

The use of plastic fibers of different fiber thickness and/or different strand thickness can also be sensible in a jacket layer to achieve partially different damage patterns in a jacket layer.

To easily enable a simple recognizability of different damage phenomena even with only small degrees of damage, the plastic fibers that have different abrasion strengths, bending fatigue strengths and/or breaking stresses and/or comprise different materials can be dyed in different colors. Alternatively or additionally, different colors can be used or different jacket layers can be dyed in different colors from jacket layer to jacket layer. The optical detection of damage to the jacket is hereby considerably facilitated since on the wear of an outer jacket layer the jacket layer therebeneath becomes visible in a different color.

The rope core can in particular also have a different color than the jacket, in particular a different color than the bottommost or innermost jacket layer of the jacket so that the different color of the rope core at the latest becomes visible on a complete wear of the jacket.

The named image evaluation device for detecting the damage pattern can generally have different configurations. In order, for example, to detect a split of the wear jacket and thus thickened portions and thinned portions associated therewith in the rope contour, the image evaluation device can comprise contour evaluation means that can determine with reference to an image comparison thickened rope portions due to splits of the wear jacket and/or thinned portions in regions in which the rope jacket is worn and/or is missing and/or other contour changes such as undulations that occur with respect to the desired state of the rope contour.

An image comparison with a reference image does not necessarily have to take place here, a conclusion of damage be made from a specific contour extent per se, for example from particular irregularities such as bulges or indentations or undulations that signalize a replacement state. This is based on the idea that an undamaged rope has a uniform contour extent and that to this extent irregularities such as undulations can be considered an indication of damage to the jacket.

Alternatively or additionally, the image evaluation device can comprise color pattern evaluation means that can determine changes of the color pattern that the rope in the taken image shows with reference to an image comparison. Such a color pattern can in particular mean the sequence of predefined colors and/or an arrangement pattern of predefined colors, for example to the extent that red, white and green stripes are alternately present along the rope or a checkerboard pattern is present when the rope is undamaged. If this desired color sequence changes, for example due to a disappearance of the white stripes into a red-green stripe pattern, said color pattern evaluation means can determine rope damage using such a deviation. In this respect, a corresponding gray-scale pattern can be viewed in the sense of a color pattern, for example such that a light gray/dark gray checkerboard pattern is provided or in that black, anthracite, and light gray stripes are arranged alternately along the rope and are detected and evaluated by the image detection device. If, for example, the anthracite stripes disappear so that the gray scale pattern becomes a black and white pattern, said color pattern evaluation device can recognize this and can interpret it as rope damage. Black, white, and intermediate stages such as gray can therefore also be considered as colors.

Alternatively or additionally, said image evaluation means can also comprise color surface ratio evaluation means that can determine the surface ratio of a respective color in a recorded image of the rope that the color adopts in the total surface of the rope. If, for example, the wear jacket of the rope is, as in the example previously described, in red, white, green stripes, with the stripe widths being of equal size so that each color takes up a third of the total area, said color surface ratio evaluation means can determine wear of the white fibers or strands and damage to the rope associated therewith when the surface ratio of said white fibers or strands reduces from a desired value of 33% to, for example, less than 25% or less than 15%.

Said color surface ratio evaluation means can optionally also determine the occurrence of a new color and its surface ratio. If, for example, the different-colored rope core becomes visible due to wear of the wear jacket, black spots can, for example, occur in the aforesaid red, white, green color pattern so that the color surface ratio evaluation means can determine damage when the surface ratio of the black spots exceeds a predefined degree.

Alternatively or additionally, the image evaluation device can comprise surface structure pattern evaluation means that can determine changes of the surface structure pattern that the rope in the taken image shows with reference to an image comparison. Such a surface structure pattern can in particular mean the sequence of predefined structures and/or an arrangement pattern of predefined structural elements, for example such that coarse-fiber, linearly extending fiber threads and fine-fiber twisted fiber threads are alternatingly present along the rope if the rope is undamaged. If this desired surface structure sequence changes, for example due to a disappearance of the fine-fiber threads, said surface structure pattern evaluation means can determine rope damage on the basis of such a deviation.

The aforesaid image evaluation device can also comprise stretch evaluation means in an advantageous further development of the invention that can determine a stretching of the high-strength fiber rope and/or of its wear jacket with reference to a comparison of the current rope image with a stored reference image. Said stretch evaluation means can in particular identify and determine the spacing from one another of predefined color pattern points and/or pixel pattern points in the longitudinal direction of the fiber rope and/or in the transverse direction of the fiber rope and can compare it with a desired value that can be determined from the image of the fiber rope in the original state or in the desired state to be able to determine a stretching of the rope in the longitudinal direction and/or in the transverse direction.

If, for example, the rope, in particular its wear jacket, is provided with strands that are red or of a different color that can, for example, be worked spirally in the jacket, these red fibers or strands have a predefined spacing from one another in the image of the fiber rope. If the rope undergoes excessive stretching due to aging and/or damage, this is reflected in a corresponding spacing increase of the red stripes with reference to which the replacement state or damage can be recognized.

The detection device for detecting the actual state of the high-strength fiber rope can also have a sensor system for the sensory detection of the actual state of the rope core and/or of the rope jacket in order optionally, alternatively or additionally to the optical detection of the condition of the wear jacket, to be able to detect the actual condition of the rope core and/or of the rope jacket in a different manner. This sensor system can generally work in different manners and can optionally determine a plurality of parameters of the rope core and/or rope jacket to assume damage on predefined changes of one or more rope core parameters and/or rope jacket parameters.

Said sensor system can, for example, have an optical reflection sensor that can determine the property of the wear jacket and/or of the rope core and/or of the rope layer with reference to the reflections of the wear jacket and/or of the rope core and/or of predefined rope layers. For example, the wear jacket and/or the rope core and/or a specific rope layer can be provided with a reflection layer that reflects a sensor signal such that, with an undamaged rope, a predefined reflection signal will arrive or be recorded at the sensor.

If this reflection signal shows excessive changes or characteristic changes, rope damage can be assumed. If, for example, the wear jacket is given a reflective coating, rope damage can be assumed if the reflection signal is absent—with a worn rope jacket—or is absent at a sufficient number of points. In a similar manner it can be assumed on a reflective coating of the rope core that the wear jacket that prevents a reflection in the undamaged state is damaged on an occurrence of a reflection signal.

Alternatively or additionally, said sensor system can also comprise an ultrasound sensor that applies ultrasound to the high-strength fiber rope and that detects the reflected signal. Deeper layers of the high-strength fiber rope, in particular of its rope core, but optionally also of its wear jacket, can be monitored by means of such an ultrasound sensor since the ultrasound signal changes on rope damage, in particular on wear of the wear jacket.

Alternatively or additionally to such an ultrasound sensor, a radar sensor can also be provided that applies a radar signal to the high-strength fiber rope and detects the reflected signal. Deeper levers of the high-strength fiber rope, in particular of its rope core, but optionally also the wear jacket, and their structures can be detected by means of such a radar sensor. If characteristic changes of the radar signal are shown, damage to the high-strength fiber rope can be assumed.

Alternatively or additionally, said sensor system can also comprise a capacitively working sensor that detects the dielectric properties of the rope core and/or of the wear jacket and that can determine their changes. If predefined changes are shown in the signal of the capacitive sensor that allow a conclusion on corresponding changes of the dielectric properties of the rope core and/or of the wear jacket, rope damage can be assumed.

BRIEF DESCRIPTION OF THE DRAWINGS

The invention will be explained in more detail in the following with respect to an embodiment and to associated drawings. There are shown in the drawings.

DETAILED DESCRIPTION

Figure 4:
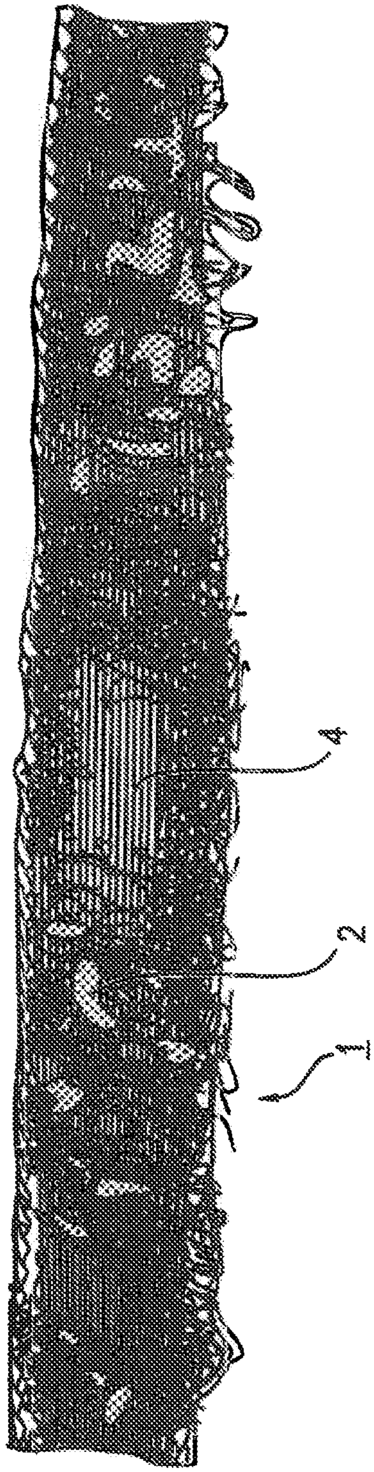
Figure 5:
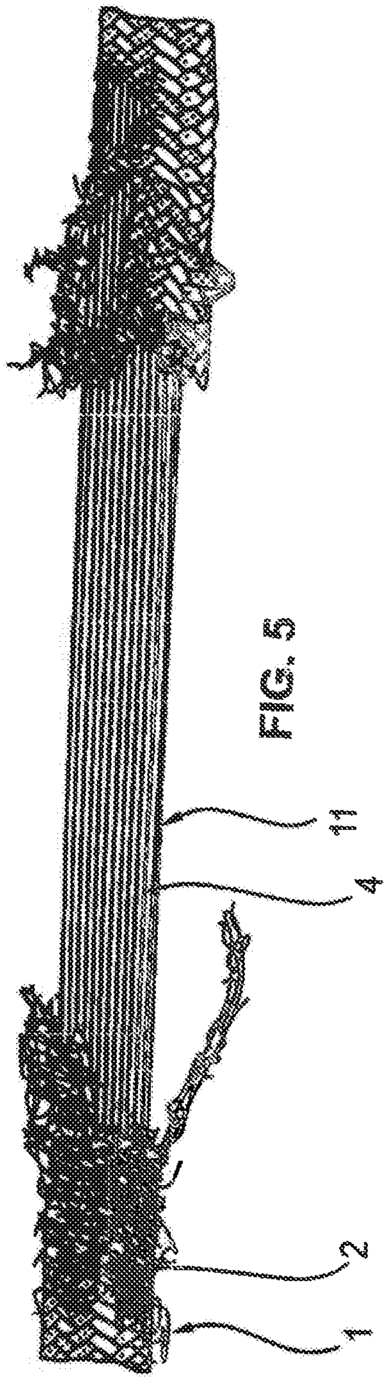

As FIGS. 4 and 5 show, for example, the high-strength fiber rope comprises a rope core 11 that can be braided or laid from strands that in turn consist of high-strength synthetic fibers or at least comprise such high-strength synthetic fibers, for example HPMA fibers, HMPE fibers, or other ones of the initially named fiber types, with said rope core 11 being able to consist of fibers of one fiber type or of fibers of different fiber types.

The jacket 2 surrounds said rope core 11 and can be seated directly on said rope core or can optionally be spaced apart therefrom by an intermediate layer. Said jacket 2 can in particular form the outer jacket of the rope 1. The rope core 11 can take over the total specified load-bearing strength of the rope 1. The jacket 2 only acts in an assisting manner beyond this, in particular as protection for the rope core 11 and as a wear indicator.

Said jacket 2 can here consist of a single jacket layer or can also comprise a plurality of jacket layers that are arranged above one another.

As the Figures show, said jacket 2 comprises strands 3 that are braided together to form the jacket 2 and can respectively consist of high-strength synthetic fibers or can at least comprise such high-strength synthetic fibers.

Said strands 3 of the jacket 2 can in particular be formed in the manner initially described in detail from different synthetic fibers of different abrasion strength and/or breaking stress and/or of different materials. As the Figures show, said strands 3 are advantageously dyed in different colors.

A jacket wear of the jacket 2 is shown in FIGS. 1 to 5 that can be caused, for example, by the rope drive, in particular the deflection of the rope around a pulley, the bending fatigue in the rope extent, the rope friction on the drum during reeling, and also the strain on a multilayer winding on the drum in which the rope sections of an upper layer threaten to cut into the rope sections of a lower layer.

Figure 1:
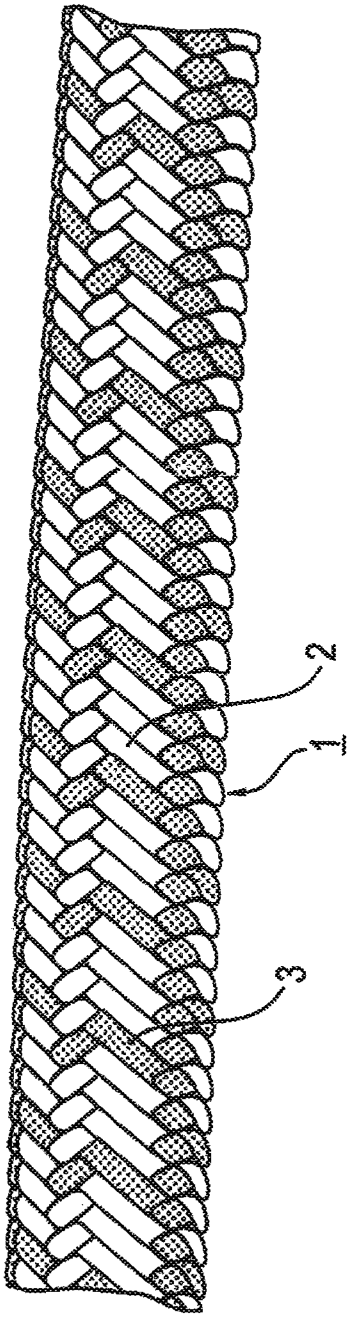
FIG. 1 to FIG. 5: respective side views of a high-strength fiber rope having a braided jacket, with the jacket wear occurring at the jacket being shown in different degrees of damage and with the rope core gradually becoming visible.

FIG. 1 shows the rope 1 with a jacket 2 and the strands 3 of the jacket in different colors. Degree of the shown damage approximately 5%.

Figure 2:
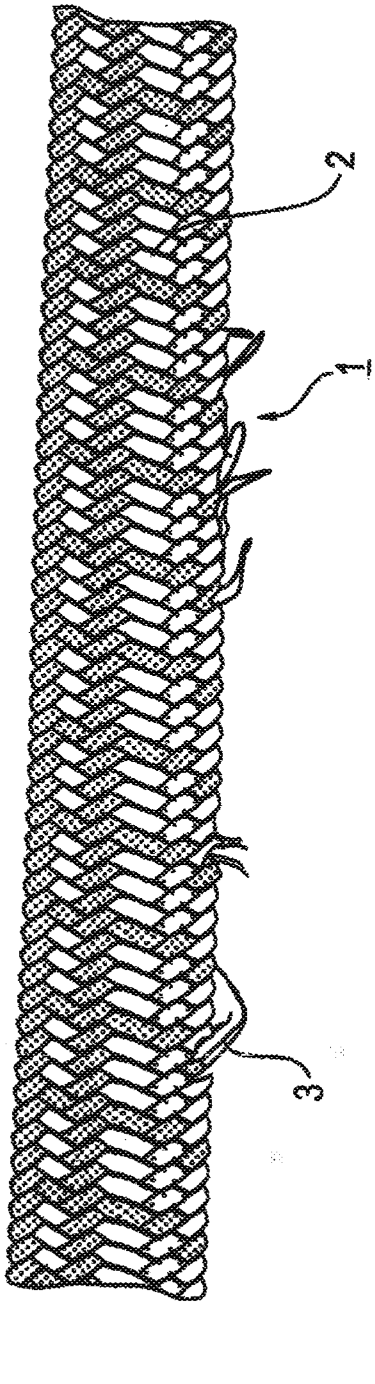

FIG. 2 shows the rope 1 with the jacket 2, but with visible wear of the individual strands 3 of the jacket. Degree of the shown damage approximately 25%.

Figure 3:
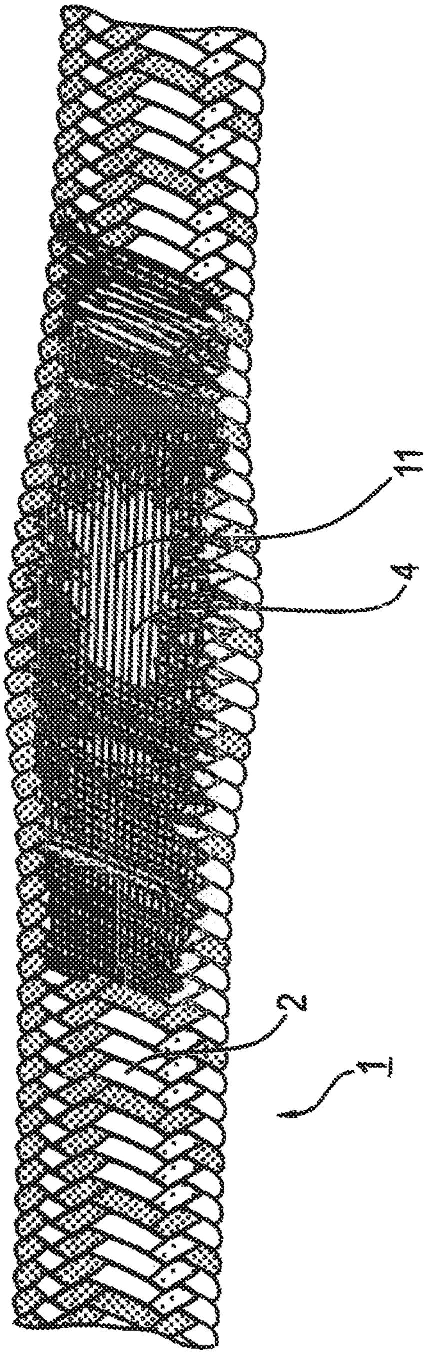

FIG. 3 shows the rope 1 whose jacket is worn over a part section of approximately 90° and the strands 4 of the carrying rope become visible. Degree of the shown damage approximately 50%.

FIG. 4 shows the rope 1 whose jacket has an advanced wear condition in a part section of approximately 180° and the strands 4 of the carrying rope are easily visible in this part section. Degree of the shown damage approximately 75%.

FIG. 5 shows the rope 1 whose jacket has a highly advanced wear condition over the total rope periphery (360°). The jacket is worn and displaced and the strands 4 of the carrying rope are fully visible in this part section. Degree of the shown damage approximately 100%.

FIGS. 6 to 9 show damage of the rope in the form of incisions that result in a gradually propagating degree of damage.

Figure 6:
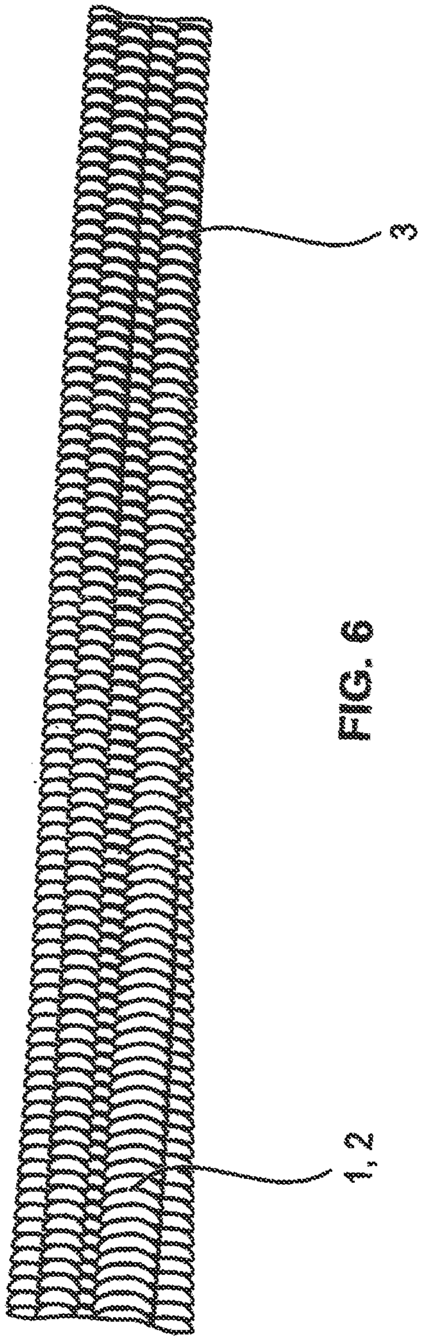
FIG. 6 to FIG. 9: respective plan views of a section of a high-strength fiber rope with a jacket in accordance with a further design of the invention, with incisions at the rope in different manifestation stages being shown as damage here.

FIG. 6 shows the rope 1 with a jacket 2 and the strands 3 of the jacket in different colors. Degree of the shown damage approximately 0%.

Figure 7:
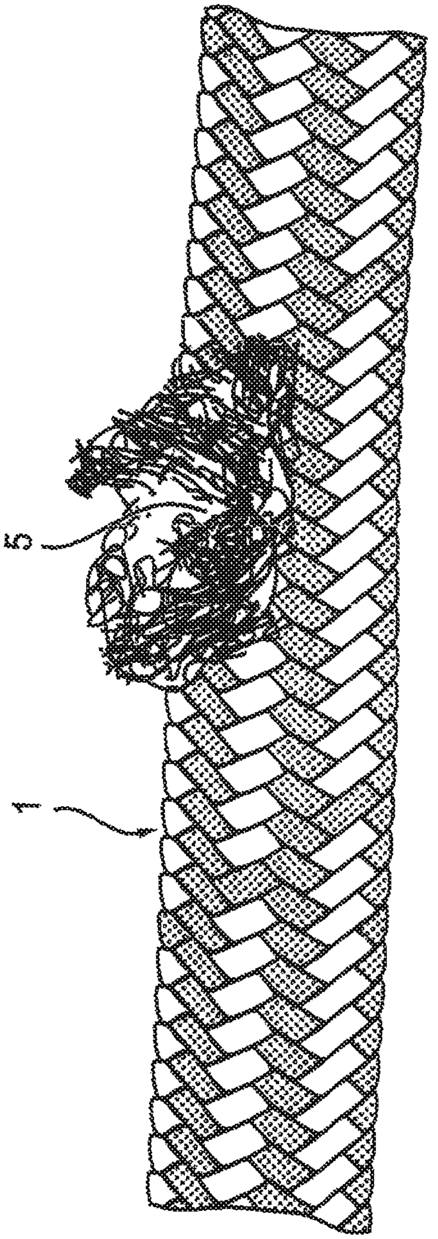

FIG. 7 shows the rope 1 whose jacket has a visibly slight incision 5. Degree of the shown damage approximately 25%.

Figure 8:
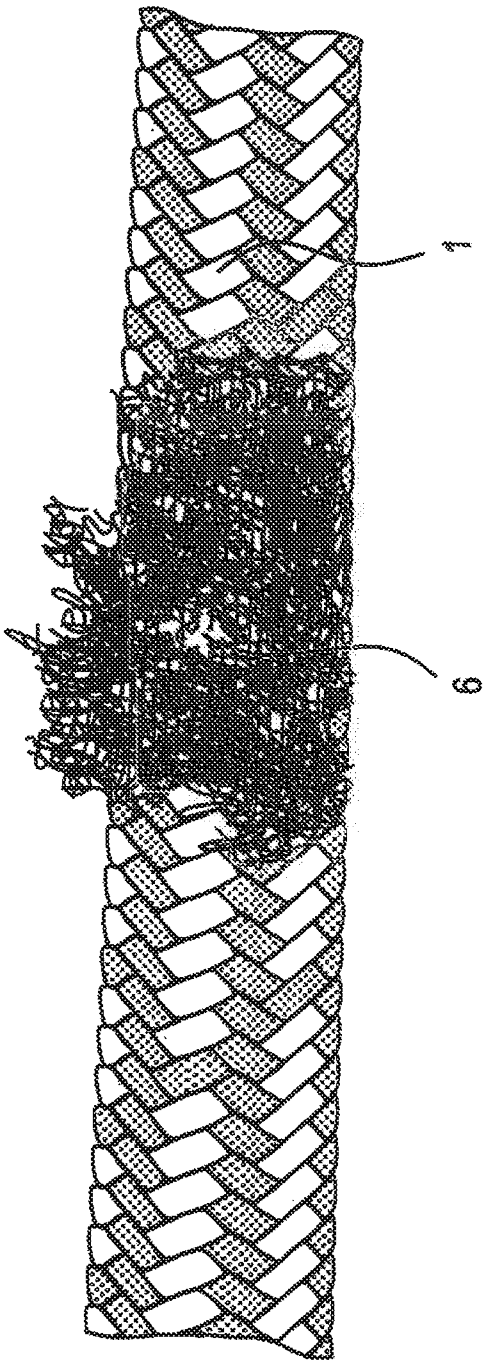

FIG. 8 shows the rope 1 whose jacket and a strand of the carrying rope have a visible incision 6. Degree of the shown damage approximately 50%.

Figure 9:
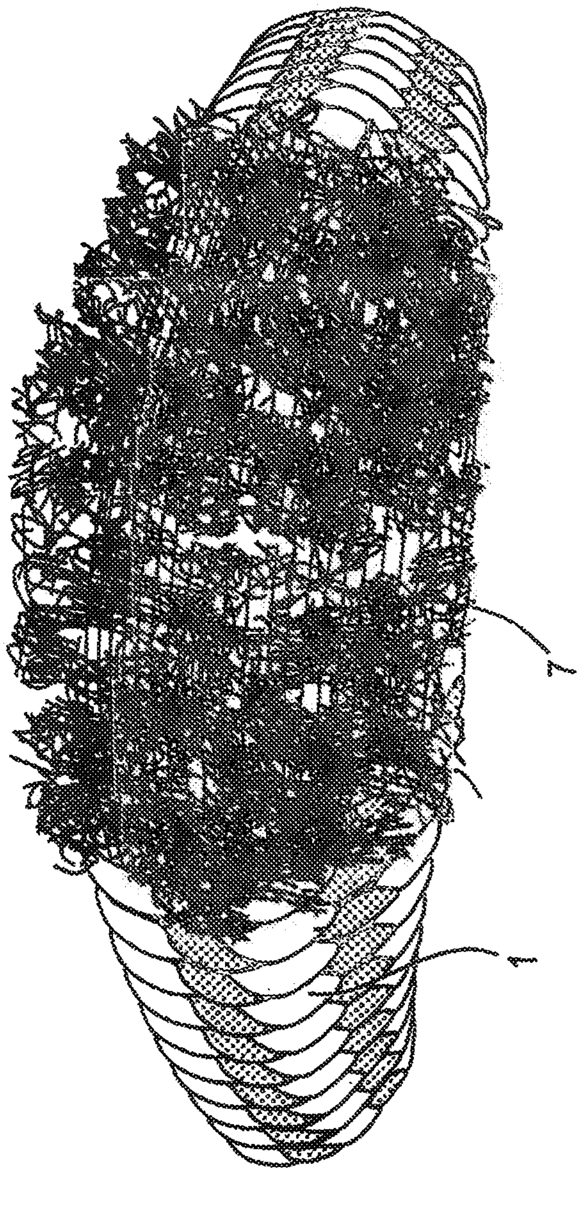

FIG. 9 shows the rope 1 whose jacket and at least one strand of the carrying rope have a visible incision 7. Degree of the shown damage approximately 100%.

FIGS. 10 to 13 finally show damage to the high-strength fiber rope in the form of crimped portions of the rope.

Figure 10:
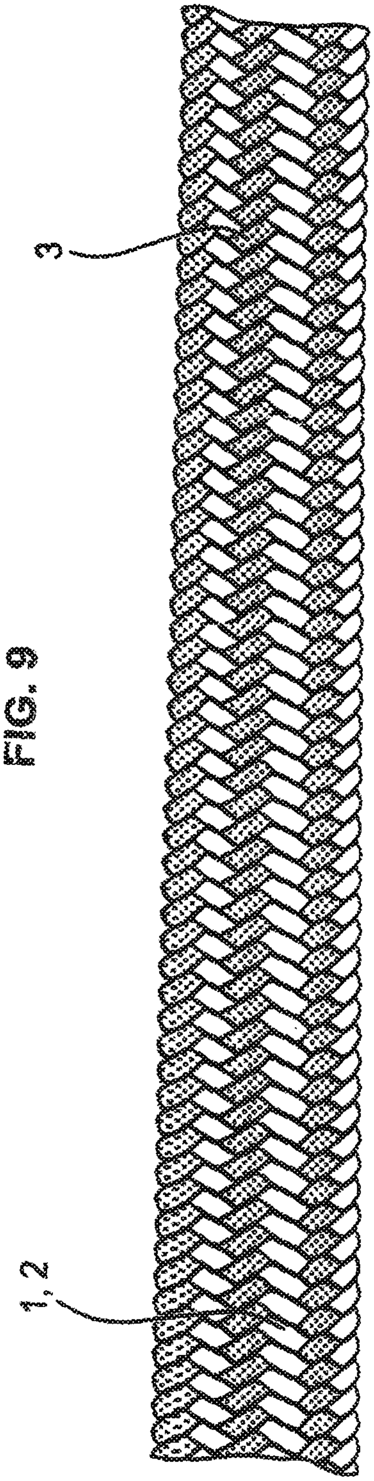
FIG. 10 to FIG. 13: respective sections of a high-strength fiber rope with a jacket in accordance with a further design of the invention, with damage to the jacket being shown in the form of a crimping of the rope in different manifestation stages.

FIG. 10 shows the rope 1 with a jacket 2 and the strands 3 of the jacket in different colors. Degree of the shown damage approximately 0%.

Figure 11:
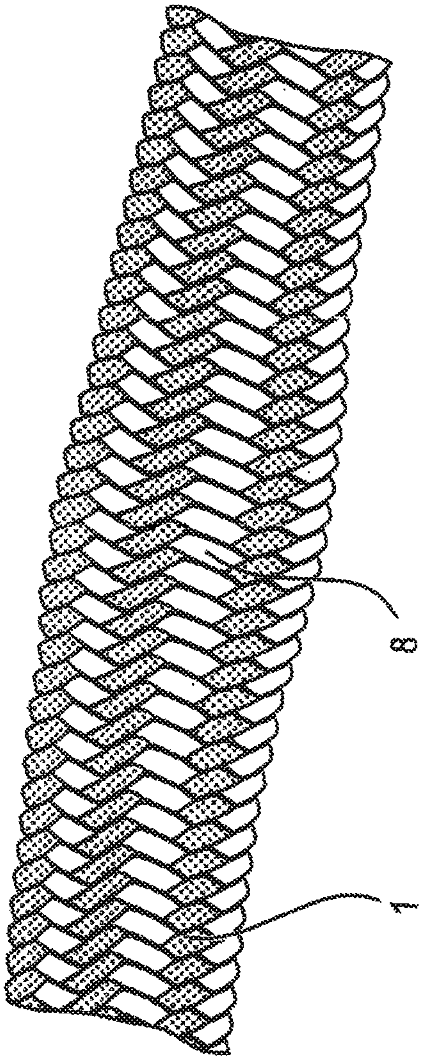

FIG. 11 shows the rope 1 with a slight crimping 8 and ovalization of the rope cross-section. Degree of the shown damage approximately 25%.

Figure 12:
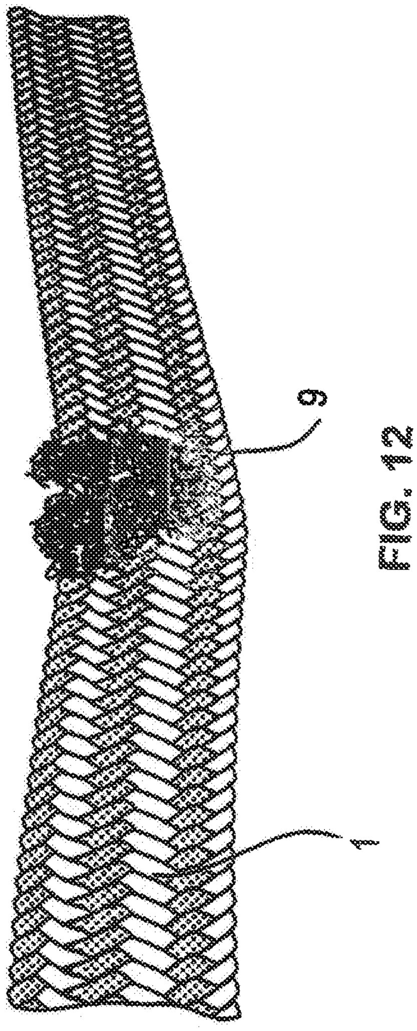

FIG. 12 shows the rope 1 with a strong crimping 9 and a strong ovalization of the rope cross-section. Degree of the shown damage approximately 50%.

Figure 13:
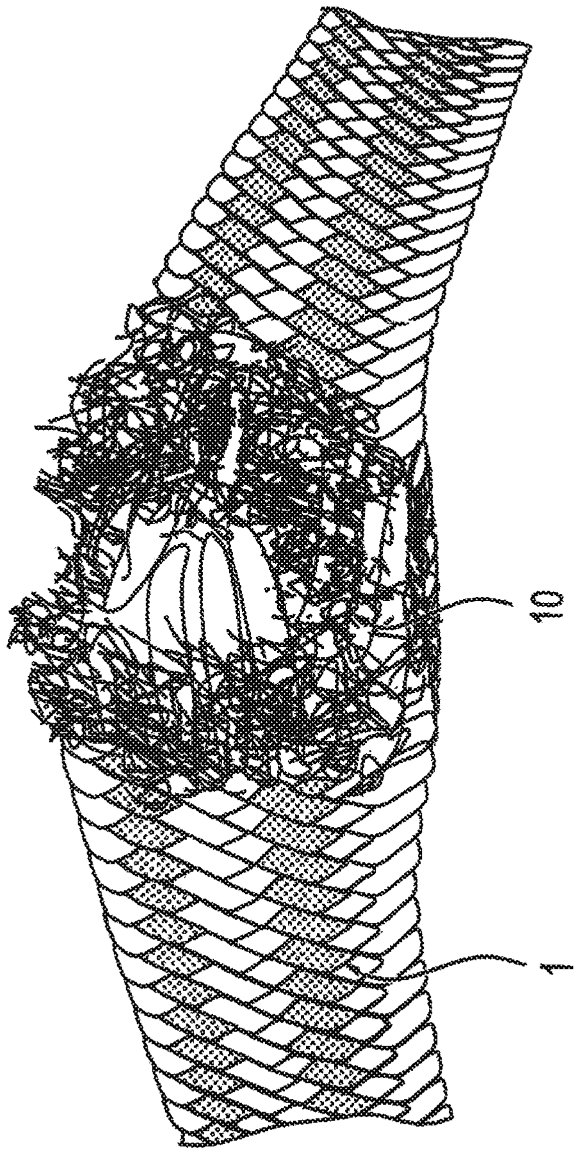

FIG. 13 shows the rope 1 with such a strong crimping 10 that the jacket is open and the damaged strands of the carrying rope escape. Degree of the shown damage approximately 100%.

Figure 14:
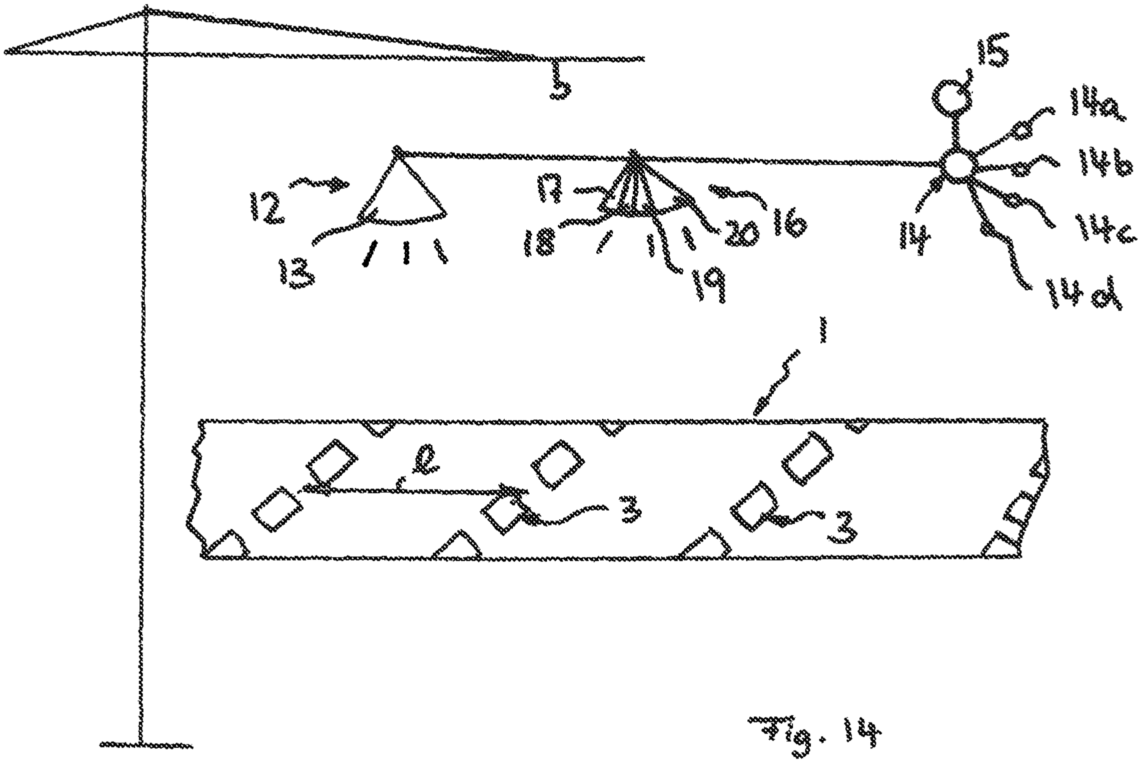
FIG. 14: a schematic representation of an apparatus for determining the replacement state and its components that provide an optical detection of the stretching of the fiber rope and, from this, a determination of the replacement state.

FIG. 14 shows the apparatus for determining the replacement state in more detail. An actual image of the rope is in particular recorded by means of an optical detection device 12, for example a camera 13, said image then being optically compared with the reference representations stored in a reference image store 15 by means of an automatic or semiautomatic evaluation device comprising an image evaluation device 14 to detect and categorize damage that can be seen in the actual image.

The evaluation device can then sum the individual damage phenomena in the initially named manner and can output a replacement state signal as required. As FIG. 14 shows, said apparatus for recognizing the replacement state can be integrated in lifting gear, in particular in a crane 21 and its crane control.

As FIG. 14 shows, the image evaluation device 14 can comprise contour evaluation means 14*a* that can determine thickened rope portions due to splitting of the wear jacket and/or thinned rope portions in regions in which the rope jacket 2 is worn and/or is missing and/or other contour changes such as undulations that occur with respect to the desired state of the rope contour.

The image evaluation device 14 can furthermore comprise color pattern evaluation means 14*b* that can determine changes of the color pattern that the rope in the recorded image shows with reference to an image comparison and that can determine the replacement state from this.

Said image evaluation means 14 can also comprise color surface ratio evaluation means 14*c* that can determine the surface ratio of a respective color in a recorded image of the rope 1 that the color adopts in the total surface of the rope 1. If, for example, the wear jacket 2 of the rope 1 is in red, white, green stripes, with the stripe widths being of equal size so that each color takes up a third of the total area, said color surface ratio evaluation means 14 can determine wear of the white fibers or strands and damage to the rope 1 associated therewith when the surface ratio of said white fibers or strands reduces from a desired value of 33% to, for example, less than 25% or less than 15%.

Said color surface ratio evaluation means 14 can also determine the occurrence of a new color and its surface ratio. If, for example, the different-colored rope core 11 becomes visible due to wear of the wear jacket 2, black spots can, for example, occur in the aforesaid red, white, green pattern so that the color surface ratio evaluation means 14*c* can determine damage when the surface ratio of the black spots exceeds a predefined degree.

The image evaluation device 14 can also comprise stretch evaluation means 14*d* in an advantageous further development of the invention that can determine a stretching ΔI of the high-strength fiber rope 1 and/or of its wear jacket 2 with reference to a comparison of the current rope image with a stored reference image. Said stretch evaluation means 14*d* can in particular identify and determine the spacing I from one another of predefined color pattern points and/or pixel pattern points in the longitudinal direction of the fiber rope 1 and/or in the transverse direction of the fiber rope, cf. FIG. 14, and can compare it with a desired value that can be determined from the image of the fiber rope in the original state or in the desired state and/or with a known progression to be able to determine a stretching of the rope in the longitudinal direction and/or in the transverse direction.

Figure 15:
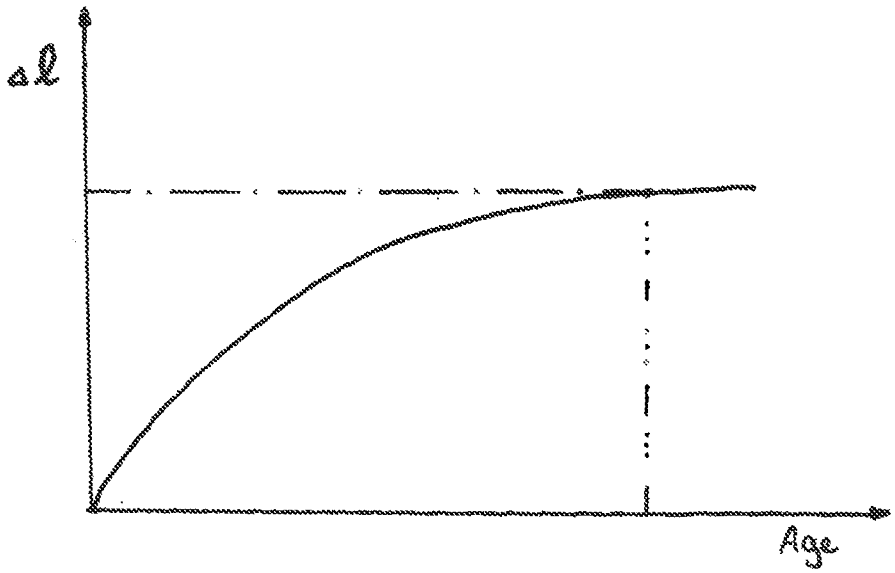
FIG. 15: a schematic representation of the underlying relationship between the rope stretching and the replacement state with reference to which the apparatus of FIG. 14 determines the replacement state.

FIG. 15 schematically shows—without being restricted to the specific curve progression shown in FIG. 15— a progression of the rope stretching ΔI over aging or damage so that a conclusion can be drawn on the replacement state with reference to such a progression when determining a certain rope stretching ΔI.

If, for example, the rope 1, in particular its wear jacket 2, is provided with strands 3 that are red or of a different color that can, for example, be worked spirally in the jacket 2, these red fibers or strands have a predefined spacing I from one another in the image of the fiber rope 1. If the rope undergoes excessive stretching due to aging and/or damage, this is reflected in a corresponding spacing increase ΔI of the red stripes with reference to which the replacement state or damage can be recognized, cf. FIGS. 14 and 15.

The detection device 12 for detecting the actual state of the high-strength fiber rope 1 can also have a sensor system 16 for the sensory detection of the actual state of the rope core 11 and/or of the rope jacket 2 in order optionally, alternatively or additionally to the optical detection of the condition of the wear jacket 2, to be able to detect the actual condition of the rope core 11 and/or of the rope jacket 2 in a different manner. This sensor system 16 can advantageously determine a plurality of parameters of the rope core 11 and/or of the rope jacket 2 to assume damage on predefined changes of one or more rope core parameters and/or rope jacket parameters.

Said sensor system 16 can, for example, have an optical reflection sensor 17 that can determine the property of the wear jacket and/or of the rope core and/or of the rope layer with reference to the reflections of the wear jacket 2 and/or of the rope core 11 and/or of predefined rope layers. For example, the wear jacket and/or the rope core and/or a specific rope layer can be provided with a reflection layer that reflects a sensor signal such that, with an undamaged rope, a predefined reflection signal will arrive or be recorded at the sensor. The reflection sensor 17 can, for example, comprise a light source by means of which the rope 1 can be irradiated with defined light conditions so that a corresponding reflection signal can be caused.

If this reflection signal shows excessive changes or characteristic changes, rope damage can be assumed. If, for example, the wear jacket 2 is given a reflective coating, rope damage can be assumed if the reflection signal is absent—with a worn rope jacket 2—or is absent at a sufficient number of points. In a similar manner it can be assumed on a reflective coating of the rope core 11 that the wear jacket 2 that prevents a reflection in the undamaged state is damaged on an occurrence of a reflection signal.

Alternatively or additionally, said sensor system 16 can also comprise an ultrasound sensor 18 that applies ultrasound to the high-strength fiber rope 1 and that detects the reflected signal. Deeper layers of the high-strength fiber rope 1, in particular of its rope core 11, but optionally also of its wear jacket 2, can be monitored by means of such an ultrasound sensor 18 since the ultrasound signal changes on rope damage, in particular on wear of the wear jacket.

A radar sensor 19 can furthermore also be provided that applies a radar signal to the high-strength fiber rope 1 and detects the reflected signal. Deeper levers of the high-strength fiber rope 1, in particular of its rope core 11, but optionally also the wear jacket 2, and their structures can be detected by means of such a radar sensor 19. If characteristic changes of the radar signal are shown, damage to the high-strength fiber rope 1 can be assumed.

Said sensor system 16 can also comprise a capacitively working sensor 20 that detects the dielectric properties of the rope core 11 and/or of the wear jacket 2 and that can determine their changes. If predefined changes are shown in the signal of the capacitive sensor 20 that allow a conclusion on corresponding changes of the dielectric properties of the rope core 11 and/or of the wear jacket 2, rope damage can be assumed.

We claim:

1. An apparatus for recognizing a replacement state of a high-strength fiber rope that has a rope core and a wear-indicating jacket surrounding the rope core, and wherein the high-strength fiber rope comprises high-strength plastic fibers or plastic strands, comprising:

a reference damage store in which reference representations of the high-strength fiber rope are contained with different degrees of damage to the wear-indicating jacket of the high-strength fiber rope with reference to which a degree of damage to the wear-indicating jacket and/or a degree of wear of the wear-indicating jacket is determined by an optical comparison of an actual image of the high-strength fiber rope with the stored reference representations, wherein the replacement state is determined with reference to the degree of damage and/or the degree of wear.

2. The apparatus of claim 1, further comprising an optical detection device comprising a camera, wherein the optical detection device is configured to detect the actual image of the high-strength fiber rope.

3. The apparatus of claim 2, wherein the optical detection device is configured to detect color actual images of the high-strength fiber rope, with an image evaluation device being provided to detect and to categorize damage to the high-strength fiber rope with reference to different colors in which the high-strength plastic fibers or plastic strands of the high-strength fiber rope are dyed and/or in which different jacket layers of the wear-indicating jacket of the high-strength fiber rope are dyed.

4. The apparatus of claim 2, wherein the optical detection device comprises an optical reflection sensor to detect light reflections that arise at a reflective layer of the high-strength fiber rope, and wherein the reflective layer comprises the wear-indicating jacket and/or the rope core.

5. The apparatus of claim 1, further comprising an automatic or semiautomatic image evaluation device for the optical comparison of the actual image of the high-strength fiber rope with the stored reference representations and for categorizing damage in the actual image.

6. The apparatus of claim 5, wherein the automatic or semiautomatic image evaluation device is provided to detect and to categorize damage with reference to different colors in which the wear-indicating jacket is dyed and/or the rope core is dyed.

7. The apparatus of claim 5, wherein the automatic or semiautomatic image evaluation device is provided to detect and to categorize damage with reference to different materials of which plastic fibers of at least one jacket layer of the wear-indicating jacket are comprised.

8. The apparatus of claim 5, wherein the automatic or semiautomatic image evaluation device comprises a contour evaluator to determine contour changes of the high-strength fiber rope and to determine the replacement state with reference to a determined contour change, and wherein the contour changes comprise thickened rope portions and/or thinned rope portions and/or rope surface undulations.

9. The apparatus of claim 5, wherein the automatic or semiautomatic image evaluation device comprises a color pattern evaluator to determine changes of a color pattern of the high-strength fiber rope and to determine the replacement state with reference to a found change in the color pattern of the high-strength fiber rope.

10. The apparatus of claim 5, wherein the automatic or semiautomatic image evaluation device comprises a color surface ratio evaluator to determine a surface ratio of a color in the actual image of the high-strength fiber rope and to determine the replacement state with reference to a found color surface ratio.

11. The apparatus of claim 5, wherein the automatic or semiautomatic image evaluation device comprises a stretch evaluator to optically determine a spacing of specific color pattern points and/or pixel group points in the actual image of the high-strength fiber rope and to determine a rope stretch with reference to a found spacing and to determine the replacement state with reference to the found rope stretch.

12. The apparatus of claim 1, further comprising an evaluation device for summing individual damage phenomena to determine a total degree of damage and to output a replacement state signal on a reaching of a predefined total degree of damage.

13. The apparatus of claim 1, further comprising a sensor system for sensory detection of characteristic parameters of the wear-indicating jacket and/or of the rope core, wherein the sensor system comprises at least one of the following sensors:

an ultrasound sensor for applying ultrasound to the high-strength fiber rope;

a radar sensor for detecting the high-strength fiber rope by means of radar; and a capacitive sensor for a capacitive detection of dielectric properties of the rope core and/or of the wear-indicating jacket.

14. The apparatus of claim 1, wherein the apparatus is integrated in lifting gear comprising a crane comprising a tower crane and/or a telescopic crane and/or a harbor crane and/or a ship's crane, wherein the lifting gear comprises a lifting rope or a guying rope comprising the high-strength fiber rope, and wherein the high-strength fiber rope comprises the rope core comprising the high-strength plastic fibers or plastic strands, and comprising the wear-indicating jacket surrounding the rope core.

15. A lifting gear comprising:

a crane comprising a tower crane and/or a telescopic crane and/or a harbor crane and/or a ship's crane, comprising:

a high-strength fiber rope; and the apparatus of claim 1 for recognizing the replacement state of the high-strength fiber rope.

16. The lifting gear of claim 15, wherein the high-strength fiber rope forms a crane lifting rope or a crane boom guying rope.

* * * * *